B. M. W. HANSON.
CLUTCH.
APPLICATION FILED OCT. 7, 1910.
989,007.
Patented Apr. 11, 1911.
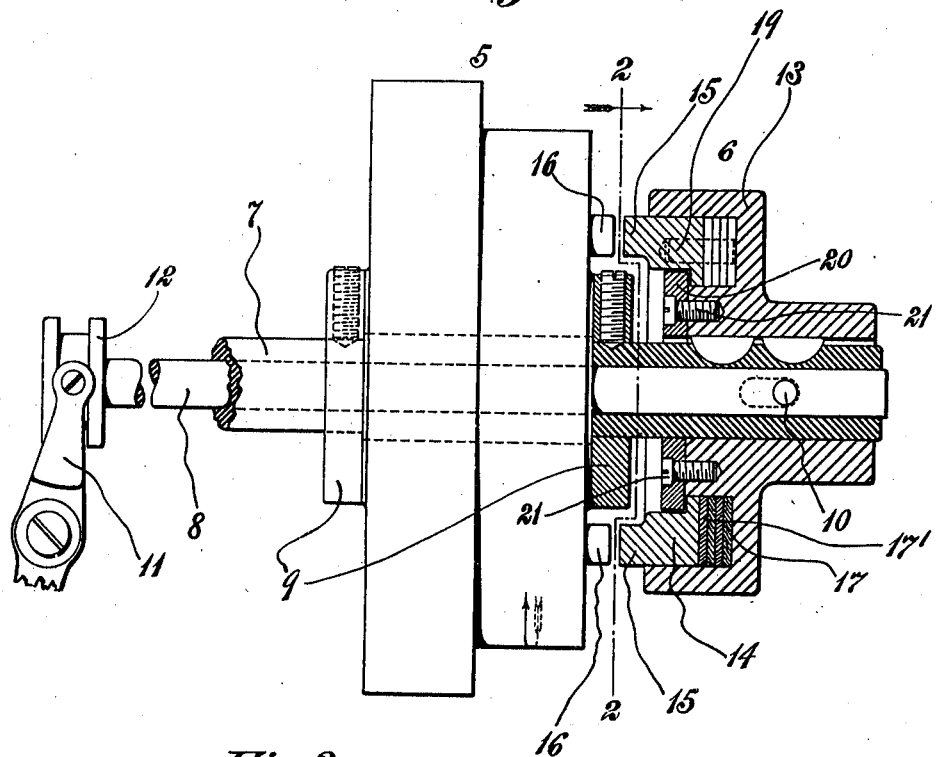
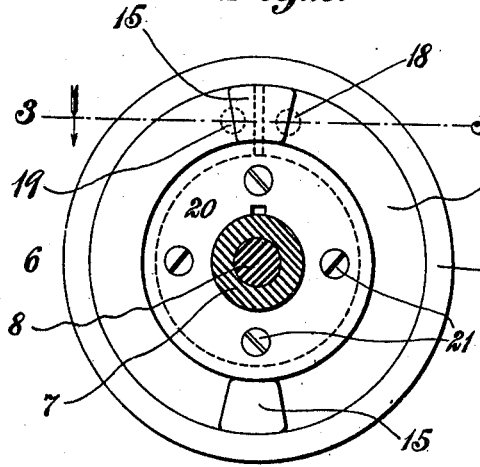
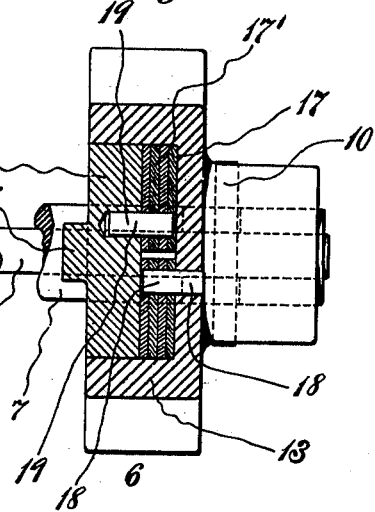
Witnesses:
Inventor:
B. M. W. Hanson
By his Attorneys,
Sutherland & Anderson

UNITED STATES PATENT OFFICE.

BENGT M. W. HANSON, OF HARTFORD, CONNECTICUT, ASSIGNOR TO PRATT & WHITNEY COMPANY, OF HARTFORD, CONNECTICUT, A CORPORATION OF NEW JERSEY.

CLUTCH.

989,007. Specification of Letters Patent. Patented Apr. 11, 1911.

Application filed October 7, 1910. Serial No. 585,822.

*To all whom it may concern:*

Be it known that I, BENGT M. W. HANSON, a citizen of the United States, residing at Hartford, in the county of Hartford and State of Connecticut, have invented certain new and useful Improvements in Clutches, of which the following is a specification.

This invention relates to clutches, the object of the invention being to provide a simple device of this character having effective means for receiving the thrusts or absorbing the shocks of the relatively movable member of the clutch when the parts thereof are clutched together, and this action I accomplish without the necessity of a spring or springs, and thereby eliminate the well-recognized defects of such latter means.

In the accompanying drawings I have represented one convenient form of embodiment of the invention which I will fully set forth in the following description to enable those skilled in the art to practice the invention, but I do not restrict myself to this showing as I may depart therefrom in several respects within the scope of my invention as expressed in the claims succeeding said description.

Referring to the drawings: Figure 1 is a sectional elevation of a clutch embodying my invention, the members thereof being shown as separated and also supported by a shaft. Fig. 2 is a vertical section on the line 2—2 in Fig. 1 looking in the direction of the arrow. Fig. 3 is a horizontal section of one of the members of the clutch, the section being on the line 3—3 of Fig. 2 and also looking in the direction of the arrow.

Like characters refer to like parts throughout the several figures.

A clutch including my invention preferably has a driving and a driven member, and while it is immaterial which of these two is provided with the pad to which I have referred said pad is preferably directly associated with the driven member. Driving and driven members such as satisfactorily answer my purpose may be those designated respectively in a general way by 5 and 6, the driving member being shown as a cone pulley, both in the present case being supported by the shaft 7 to which the driven member is keyed, the driving member being loosely carried by said shaft which is represented as hollow to receive the shifting device 8 for moving the driven member 6 into and out of clutched relation with the driving or loose member which is held in the proper position on the shaft 7 by means of collars 9 pinned or otherwise suitably connected thereto. The driven clutch member 6 may, as shown, be connected by the pin 10 with the shifting device 8 which may as illustrated be operated by a forked lever 11, the branches of which have pins to enter a peripheral channel in the collar 12 rigidly connected with one end of the shifting device or rod 8. I have not shown the belt which is employed to turn the driving member 5. As a matter of fact this driving member might be of some other type. The two members 5 and 6 are shown out of driving relation in Fig. 1. They are coupled in the construction shown by projections or their equivalents thereon put into engagement with each other by the movement of the rod 8 toward the left in said figure, so as to effect the rotation of the shaft 7 in a manner that will be hereinafter explained.

The driven member 6 is shown as consisting of sections, what might be considered a main section 13 made practically in the form of a disk and an auxiliary section 14, the latter being equipped on its inner face with practically diametrically opposite projections or teeth 15 to coöperate with substantially similar projections or teeth 16 on the driving member 5. The auxiliary section 14 is shown as fitted comparatively freely in a circular channel or groove 17 in the inner face of the main section 13, and the shock absorbing pad is located in the annular space or chamber presented collectively by the two sections 13 and 14 by virtue of which said pad is confined in place so that it can properly and effectively exercise its function, although there may be instances where I should depart from this confinement of the pad.

A pad such as answers satisfactorily my purpose is that denoted in a general way by 17′, said pad being in the form of a divided or split ring and being made up of a number of sub-rings or plies which may be fitted flatwise against each other or which might be adhesively connected as necessity requires. One end of the pad 17′ is connected with the main section 13 as by the pin 18, while the other end of said pad is similarly connected with the auxiliary annular section 14 by an approximately similar pin 19, both pins extending through all the rings of the pad.

As a means for holding the auxiliary section 14 in place, the ring 20 may be provided, said ring being connected for example by screws 21, with the body of the main section 13, and its marginal portion overlying the inner marginal portion of the auxiliary section 14 or fitting in an inner rabbet therein. The projections 15 on the driven member 6 of the clutch are shown as being out of contact with the projections 16 on the driving member 5 thereof. By shifting the member 6 to carry the projections 15 into the path of the projections 16 the two members of the clutch will be clutched, and it is apparent that some shock will follow this operation. The shock, however, is wholly absorbed or received by the pad 17' of fibrous or similar material such as leather or other comparatively soft material. By soft material I mean something, as will be evident, different from a metal spring, which will effectually resist the shocks, and this material may widely vary; preferably, however, it is of some character softer than the body or at least the active or engaging portions of the clutch members. The clutching effect, however, is transferred from the member 14 to the member 13 through the interposed pad 17' whereby the proper driving relation will be assured. In the present instance the shock due to clutching is taken up by the pad 17' being initially applied to one of the pins (18 or 19,) then transferred to the pad and then received by the other pin. By the divided pad made preferably of annular divided form I transmit the shock through a relatively considerable arc.

It will be clear that while I effectively receive the thrust which occurs on the connection of two relatively moving clutch members, I do not do so with a spring. A spring has many disadvantages. One of them is the liability to snap at critical points while another is the reactive effect of springs. This reaction is of particular disadvantage when the load is lighter than the spring in that in such an event said spring by its thrust will affect accuracy of results. There are also other defects inherent in springs with which clutch users are so thoroughly familiar that it is unnecessary to go into these at any more length.

The clutch hereinbefore described is very simple in construction, can be inexpensively made, and its parts can be quickly assembled, while shock can be effectively absorbed without affecting in any way the life of the shock absorbing element, the resiliency of springs being as is well-known seriously affected by constant clutching.

What I claim is:

1. A clutch comprising a pair of members provided with relatively movable means to effect the clutching and unclutching of said members, one of the latter being in sections, and a divided annular pad, constituting a shock absorbing device, connected with the respective sections of said sectional member.

2. A clutch comprising a pair of members provided with relatively movable means to effect the clutching and unclutching of said members, one of the latter being in sections, and a shock absorbing pad of divided annular form interposed between the sections of the sectional member, the latter having an annular chamber to receive and confine said pad.

3. A clutch comprising a pair of members one of which is in sections, and a divided annular pad, constituting a shock absorbing device, and pins connecting the terminal portions of said pad with the sections of said sectional member.

4. A clutch comprising a pair of members one of which is in sections, a shock absorbing pad interposed between the sections of the sectional member and comprising several associated plies, and means for holding the plies in assembled relation and for also connecting the pad to said sections of said sectional member.

5. A clutch comprising a pair of members one of which is in sections, a divided annular shock absorbing pad consisting of several rings, and pins extending through the rings and connected with the respective sections of said sectional member.

6. A clutch comprising a member in sections, one section having an annular channel and the other section being fitted in said annular channel, and a divided annular pad fitted in the chamber presented collectively by the two sections and connected rigidly with said respective sections.

7. A clutch comprising a member having main and auxiliary sections, the main section having an annular channel and the auxiliary section consisting of a ring fitting in said channel and having on its outer face projecting means, a plurality of divided rings fitted in said annular channel and presenting collectively a shock absorbing pad, and pins carried by the respective sections, the pins extending through the rings.

In testimony whereof I affix my signature in presence of two witnesses.

BENGT M. W. HANSON.

Witnesses:
W. M. STORRS,
H. W. KILBOURNE.